(12) United States Patent
Chinomi et al.

(10) Patent No.: US 6,256,181 B1
(45) Date of Patent: Jul. 3, 2001

(54) FAN DRIVE DEVICE

(75) Inventors: Takahito Chinomi, Shiga-ken; Hideo Matsushiro, Kusatsu; Toshinari Baba, Otsu; Takehiko Nitta, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/339,242

(22) Filed: Jun. 24, 1999

(30) Foreign Application Priority Data

Jun. 25, 1998 (JP) ................................................ 10-178579

(51) Int. Cl.$^7$ ...................................................... H02H 5/00
(52) U.S. Cl. ................................ 361/23; 361/51; 361/115
(58) Field of Search ................................ 361/23, 51, 115, 361/52

(56) References Cited

U.S. PATENT DOCUMENTS 5,703,459 * 12/1997 Yasohara et al. ..................... 318/808

FOREIGN PATENT DOCUMENTS

| 61-101738 | 5/1986 | (JP) | ................................ F24F/11/02 |
| 62-46153 | 2/1987 | (JP) | ................................ F24F/11/02 |
| 63-140688 | 6/1988 | (JP) | ................................ H02P/6/02 |
| 63206187 | 8/1988 | (JP) | ................................ H02P/6/02 |

* cited by examiner

*Primary Examiner*—Stephen W. Jackson
(74) *Attorney, Agent, or Firm*—Wenderoth, Lind & Ponack, LLP.

(57) ABSTRACT

A fan drive device is not affected by variations in the strength of the fan drive motor rotor magnet or the components of the circuit for detecting fan drive motor induction voltage, or by the capacitance of a high capacitance capacitor in a dc supply circuit, and can therefore detect with good precision and without added components the speed of a high voltage, PWM drive fan drive motor when driven by an external force such as the wind. The fan drive device detects fan drive motor speed using a plurality of signals obtained from Hall ICs disposed in the fan drive motor for detecting the rotor magnet position, and prohibits fan drive motor drive when the fan drive motor speed is detected to exceed a specific threshold value.

7 Claims, 5 Drawing Sheets

FAN DRIVE DEVICE

BACKGROUND OF THE INVENTION

1. Field of the Invention

The present invention relates to a fan drive device for drive control of a fan drive motor and, more particularly, to the fan drive device having a detection circuit for detecting rotation of a fan drive motor caused by external air flow such as, for example, wind causing the fan drive motor in an outdoor unit of an air conditioner to turn.

2. Description of Related Art

Systems for detecting the wind-driven rotation of a fan drive motor in the outdoor unit of an air conditioning system are known in literature. A typical circuit diagram of a conventional fan drive device for controlling fan drive motor drive in such an outdoor unit is shown in FIG. 9. As shown in FIG. 9, this fan drive device 100 comprises a drive circuit 102 for driving a fan drive motor 110 such as found in the outdoor unit of an air conditioning system in one direction; a control circuit 103 for controlling the drive circuit 102; and a voltage monitoring circuit 104 for monitoring the output voltage of the dc power circuit 111 serving as a power source for the fan drive motor 110. The drive circuit 102 has six n-channel MOS transistors, referred to below as simply MOS transistors. The control circuit 103 controls the rotational speed of the fan drive motor 110 by PWM control of the MOS transistors. The drive circuit 102 and control circuit 103 together form a so-called inverter.

When the fan drive motor 110 is not driven by the fan drive device 100, the fan drive motor 110 can be driven by the wind in the direction opposite to the direction of normal rotation of the fan drive motor, that is, in reverse rotation. As the wind becomes stronger, the reverse rotation speed of the motor rises. If the wind is sufficiently strong, it is even possible without driving the fan drive motor 110 to achieve the air flow required for the heat exchange operation of the outdoor unit of the air conditioning system. It is also possible, however, to damage the fan drive device 100 and fan drive motor 110 when the electric power is supplied to the fan drive motor 110 to drive the latter in the direction of normal forward rotation while the fan drive motor 110 is being reverse-driven by the wind. This potential damage may be typically prevented by controlling the fan drive device 100 to not drive the fan drive motor 110 when the fan drive motor 110 is turning in the reverse direction at a speed exceeding a predetermined threshold.

A prior art method of detecting the direction of fan drive motor 110 rotation is described below.

When the fan drive motor 110 is driven by an external force, induction voltage is produced in the fan drive motor 110. This induction voltage is then converted to dc by a diode in the drive circuit 102. The voltage monitoring circuit 104 detects and monitors this converted dc voltage. If the voltage detected by the voltage monitoring circuit 104 exceeds a threshold value when the fan drive motor 110 is to be started, the control circuit 103 controls the drive circuit 102 so that the fan drive motor 110 is not started.

The fan drive motor induction voltage detected by the voltage monitoring circuit 104 in this method is, however, affected by the magnetization strength of the rotor magnet in the fan drive motor 110, as well as variations in such components as the frequency dividing resistors used for frequency dividing the induction voltage in the voltage monitoring circuit 104. This creates a problem with the induction voltage detection precision of the voltage monitoring circuit 104, and the precision of fan drive motor speed detection.

The dc power circuit 111 supplies current to the compressor (not shown) as well as the fan drive motor 110, and therefore uses high capacity electrolytic smoothing capacitors 115. As a result, when the fan drive motor 110 is reverse-driven by the wind and produces an induction voltage, a relatively long period of time is required for the dc voltage detected by the voltage monitoring circuit 104 to stabilize because more time is required to charge these high capacity electrolytic smoothing capacitors 115.

The reliability and efficiency of the voltage monitoring circuit 104 is also not optimal because high voltage is normally applied to the voltage monitoring circuit 104 and the internal frequency dividing circuit formed by the frequency dividing resistors. This is a particular problem when the voltage monitoring circuit 104 detects fan drive motor speed using the above-described method if the fan drive motor 110 is PWM driven with a high voltage.

SUMMARY OF THE INVENTION

The present invention is therefore directed to a fan drive device for resolving the aforementioned problems. More specifically, the present invention is directed to a fan drive device using a sensor for detecting the position of a rotor magnet to detect the wind-driven rotational speed of the fan drive motor, and thereby avoiding problems relating to the variation in rotor magnet strength and variation in the components of the circuit for detecting fan drive motor induction voltage.

A further object of the present invention is to provide a fan drive device capable of accurately detecting the wind-driven rotational speed in a high voltage PWM driven fan drive motor without adding component parts.

A fan drive device achieving these objects comprises a plurality of sensors for converting to and outputting as a two-value signal a change in magnetic pole position resulting from rotation of a fan drive motor rotor magnet; a drive circuit section for driving the fan drive motor; and a control circuit section for controlling the drive circuit section according to an output signal from each sensor in the fan drive motor. In this fan drive device, the control circuit section prohibits the drive circuit section from driving the fan drive motor when the fan drive motor is not driven and the fan drive motor speed is detected to as exceeding a specific speed due to an external force based on signals output from the plurality of sensors.

More specifically, the control circuit section determines the fan drive motor speed to be greater than or equal to the specific speed when, after a rectangular wave having a period less than or equal to a specific period is detected from any one of the plurality of sensors, the level of a signal applied from another of the plurality of sensors changes within a specific time. In this case, this specific time is preferably the time of one period of the detected rectangular wave.

Alternatively, the control circuit monitors signals from any two desired adjacent Hall ICs to detect the interval between signal level changes in these two signals. Whether the fan drive motor is turning at or above a specific speed can then be detected from this interval.

Further alternatively, the control circuit may monitor signals from all of the sensors to detect signal level changes in output signals from each two adjacent sensors, and detect the intervals between these signal level changes. The control circuit then determines if the fan drive motor is turning at or above a specific speed based on the time that all of these detected intervals continues below a specific level.

A fan drive device according to the present invention is therefore not affected by variations in the strength of the fan drive motor rotor magnet or the components of the circuit for detecting fan drive motor induction voltage, or by the capacitance of a high capacitance capacitor in the dc supply circuit, and can therefore detect with good precision and without adding components, the speed of a high voltage, PWM drive fan drive motor driven by an external force such as the wind.

BRIEF DESCRIPTION OF THE DRAWINGS

Other objects and attainments together with a fuller understanding of the invention will become apparent and appreciated by referring to the following description and claims taken in conjunction with the accompanying drawings, in which:

DESCRIPTION OF THE PREFERRED EMBODIMENTS

In describing preferred embodiments of the present invention, the present invention will be described as applied in conjunction with a fan drive device for driving a fan used in an outdoor unit of an air conditioning system. It is to be noted that while it is quite usual for the fan, or a drive motor for the fan, to be driven in one normal direction, the direction in which the fan or the drive motor therefor is rotated under the influence of an external force such as, for example, a wind or any other air current is referred to as "reverse direction" in contrast to the normal direction, and the manner in which the fan or the fan drive motor is rotated in such reverse direction is referred as a "reverse rotation" or "reverse drive."

Embodiment 1

Figure 1:
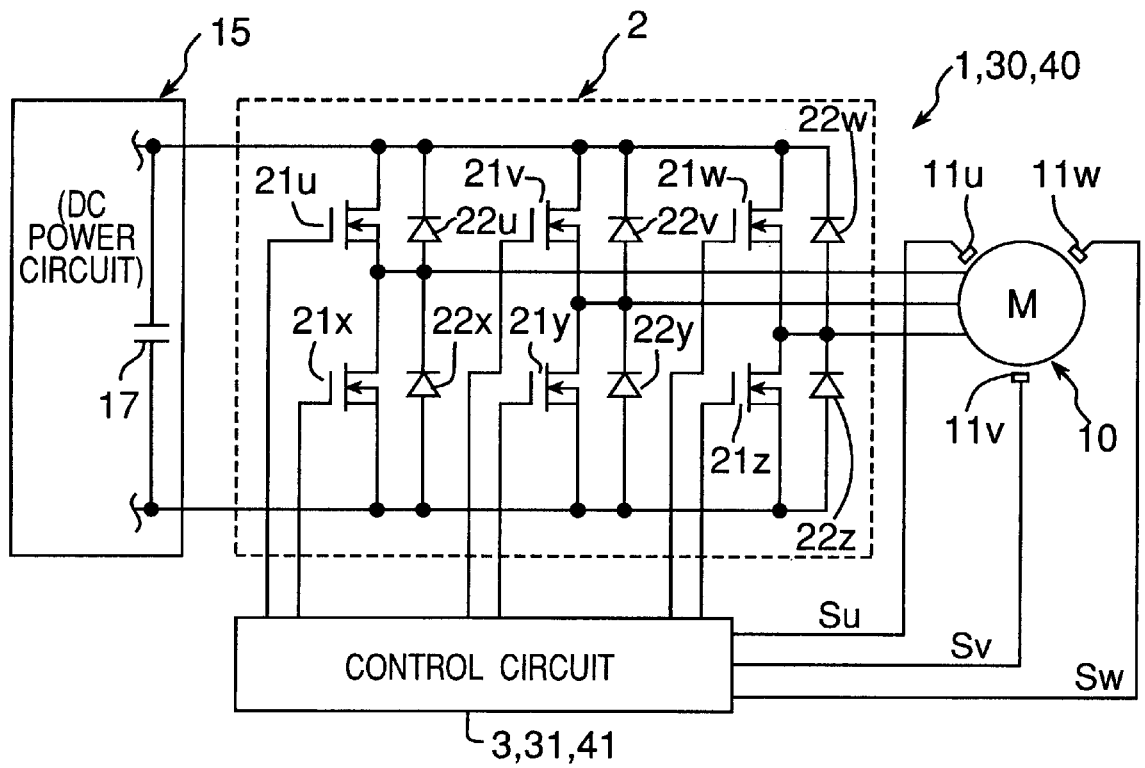
FIG. 1 is a schematic circuit diagram of an exemplary fan drive device according to a first embodiment of the present invention.

As shown in FIG. 1, a fan drive device 1 according to this preferred embodiment of the invention comprises a drive circuit 2 for driving the fan drive motor 10 of an outdoor unit of an air conditioning system, and a control circuit 3 for controlling the drive circuit 2. The control circuit 3 may comprise a microcontroller. The fan drive motor 10 is a brushless three-phase motor comprising three Hall ICs 11u, 11v, and 11w for detecting the pole position of a rotor magnet, and is supplied with a dc power from a dc source 15 through the drive circuit 2. The dc source 15 also supplies power to a compressor (not shown) and uses a high capacitance electrolytic smoothing capacitor 17. The Hall ICs 11u, 11v, and 11w are each connected to the control circuit 3, and output thereto a signal indicative of the rotor magnet polar position.

The drive circuit 2 comprises six n-channel MOS transistors 21u, 21v, 21w, 21x, 21y, and 21z, and six diodes 22u, 22v, 22w, 22x, 22y, and 22z. The gate of each MOS transistor 21u to 21z is connected to the control circuit 3. The control circuit 3 applies PWM control of each MOS transistor 21u to 21z, and drive control of the fan drive motor 10. The drive circuit 2 and control circuit 3 form a so-called inverter. It is to be noted that the drive circuit 2 and fan drive motor 10 with polar position sensor are well known in the art, as are the inverter control and PWM control applied by the drive circuit 2 to a fan drive motor 10 using this drive circuit 2 and, therefore, no further description thereof is reiterated.

When the fan drive motor 10 is started, the control circuit 3 determines based on the output signals Su, Sv, and Sw from the Hall ICs 11u, 11v, and 11w whether the fan drive motor 10 is turning at or above a specific threshold speed. If the control circuit 3 determines that the fan drive motor 10 speed equals or exceeds this threshold speed, the control circuit 3 does not drive the fan drive motor 10; if the fan drive device 1 speed is below this threshold speed, or the fan drive motor 10 is not turning, the control circuit 3 begins driving the fan drive motor 10.

The method whereby the control circuit 3 detects the fan drive motor speed will now be described in conjunction with the speed detection accomplished during the reverse-drive of the fan drive motor. This is because the speed detection method is basically the same regardless of whether the fan drive motor is turning in the normal forward direction or in the reverse direction, and differs therebetween only in the sequence in which the output signal from the Hall ICs are received.

Figure 2:
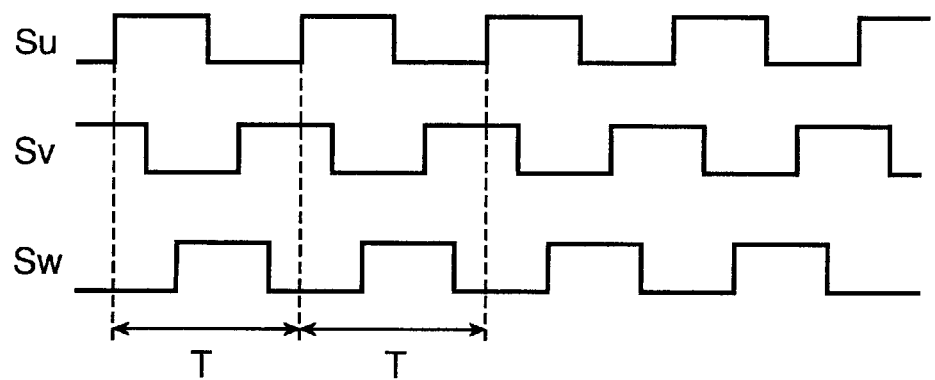
FIG. 2 is a timing chart of output signals from Hall ICs shown in FIG. 1 when the fan drive motor is reverse-driven.

FIG. 2 is a timing chart showing the output signals Su, Sv, and Sw from the Hall ICs 11u, 11v, and 11w when the fan drive motor 10 is turning in the reverse direction. As will be seen from FIG. 1, signal Su is output from Hall IC 11u, signal Sv is output from Hall IC 11v, and signal Sw is output from Hall IC 11w. To simplify the following description, it is assumed below that the fan drive motor 10 is turning in the reverse direction at a constant speed.

The control circuit 3 monitors the period T of any desired signal Su, Sv, or Sw, and begins monitoring the remaining two signals when this period T drops below a predetermined value T1. For example, the control circuit 3 monitors the period T of signal Su, and when period T drops below this value T1, begins monitoring signals Sv and Sw. The control circuit 3 thus monitors whether the speed of the fan drive motor 10 exceeds a specific threshold value based on signal Su, and begins monitoring the fan drive motor speed based on the other two signals Sv and Sw when it detects that the fan drive motor speed exceeds this threshold value. It can thereby detect whether the rotor of the fan drive motor 10 is actually spinning, or whether there is simply oscillation in the rotor magnet position caused by an external force such as the wind.

The control circuit 3 determines that the fan drive motor 10 is turning faster than the specified threshold value if the signal level of both signals Sv and Sw changes within the next period T as shown in FIG. 2.

Figure 3:
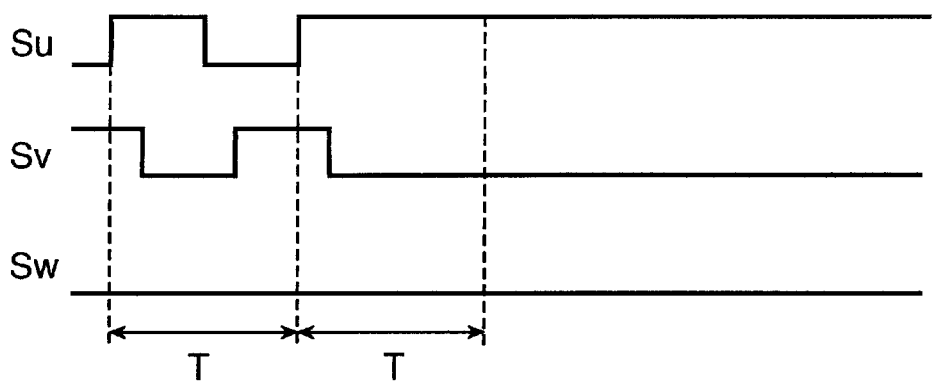
FIG. 3 is a timing chart of the output signals from the Hall ICs shown in FIG. 1 when fan drive motor rotation is unstable.

FIG. 3 is a timing chart showing typical wave forms for output signals Su, Sv, and Sw when the fan drive motor 10 is simply oscillating. In the case shown in FIG. 3, the control circuit 3 detects that the period T of signal Su, for example, is shorter than the value T1, and therefore begins monitoring signals Sv and Sw in the next period T. While the level of signal Sv changes in this next period T in this case, there is no change in the level of signal Sw. The control circuit 3 therefore determines that the rotor of the fan drive motor 10 is not turning. It will also be obvious that the control circuit 3 detects that the fan drive motor 10 is not turning if after it begins monitoring signals Sv and Sw the signal level of signals Sv and Sw does not change in the next period T.

Figure 4:
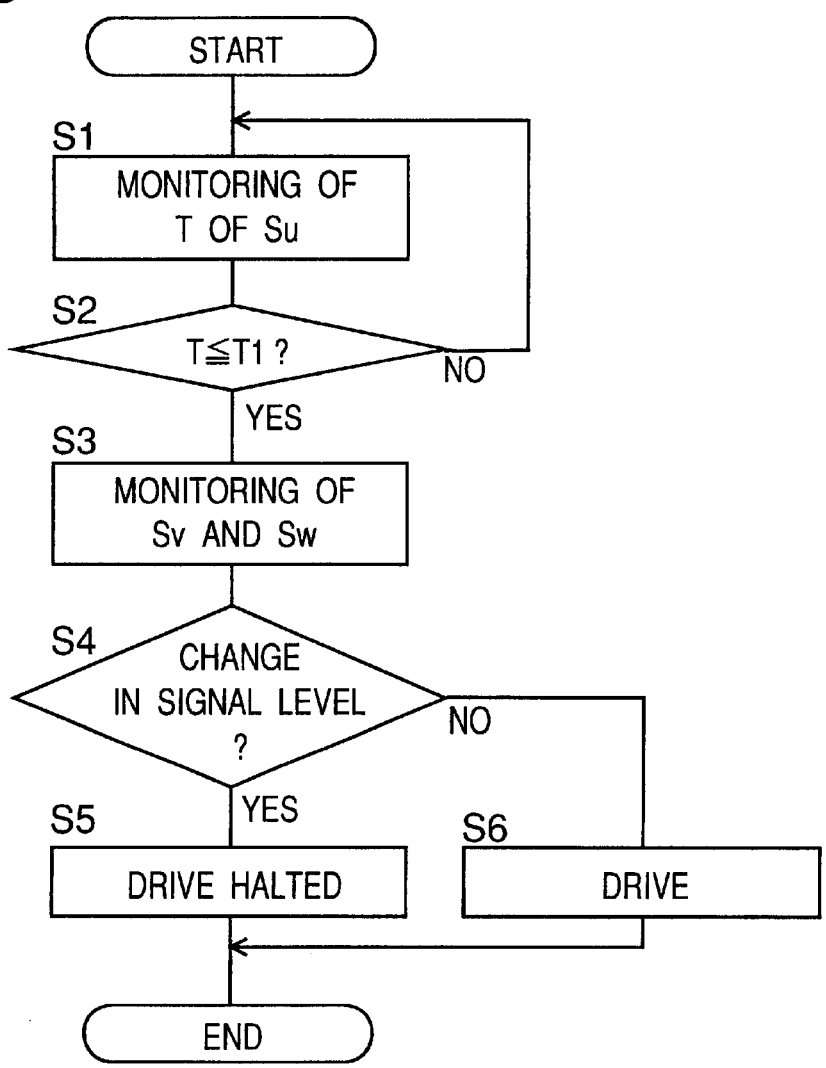
FIG. 4 is a flow chart of the fan drive motor speed detection process of the control circuit shown in FIG. 1.

FIG. 4 is a flow chart used below to describe the operation whereby the control circuit 3 detects the speed of fan drive motor 10. It is to be noted that unless otherwise stated, the operations performed at each step shown in FIG. 4 are performed by the control circuit 3.

When this operation starts, the control circuit 3 monitors the period T of one of the output signals Su, Sv, and Sw obtained from the Hall ICs 11u, 11v, and 11w (S1). The signal monitored in S1 in this example is hereinbelow assumed to be signal Su. Decision diamond S2 then determines whether period T of signal Su is less than or equal to specific value T1. If it is (yes), control passes to step S3; if period T is longer than specific value T1 (no), the procedure loops back to step S1.

Monitoring the other two signals, that is, Sv and Sw in this example, begins at step S3. Decision diamond S4 then determines whether the signal level of signals Sv and Sw changes in the next period T. If the signal levels change (yes), step S5 prohibits driving the fan drive motor 10 before the flow terminates. If there is no change in the signal level of either signal Sv or Sw (S4 returns no), step S6 instructs the drive circuit 2 to begin driving the fan drive motor 10, and the flow then ends.

As will be seen from the above description, the fan drive device according to this first embodiment of the present invention detects the rotational speed of the fan drive motor 10 using output signals Su, Sv, and Sw obtained from Hall ICs 11u, 11v, and 11w disposed in the fan drive motor 10 for detecting the polar position of a rotor magnet, and prohibits driving the fan drive motor 10 when the detected fan drive motor speed exceeds a predetermined threshold value. The fan drive device is therefore not affected by variations in the stregth of the fan drive motor rotor magnet or the components of the circuit for detecting fan drive motor induction voltage, or by the capacitance of a high capacitance capacitor in the dc supply circuit. It is therefore possible to detect the wind-driven speed of a high voltage, PWM drive fan drive motor with good precision and without adding components.

Embodiment 2

As will be seen from the above description, the fan drive device according to the first embodiment of the present invention first monitors a signal from a desired one of plural Hall ICs to detect whether the fan drive motor 10 is turning at a speed exceeding a specific threshold level. The fan drive device according to this second embodiment of the invention, however, may monitor signals obtained from two adjacent Hall ICs, detect the interval between a change in the signal level of these two signals, and based on this detected interval determine whether the fan drive motor 10 is turning at a speed greater than or equal to a specific threshold level, as will now be described in connection with a second preferred embodiment.

A fan drive device 30 according to this second embodiment differs from that of the first embodiment in operation, and is therefore described below with reference to FIG. 1. As shown in FIG. 1, this fan drive device 30 comprises a control circuit 31. The fan drive device 30 according to this second embodiment is described below with reference to the differences in the operation of the control circuit 31.

Figure 5:
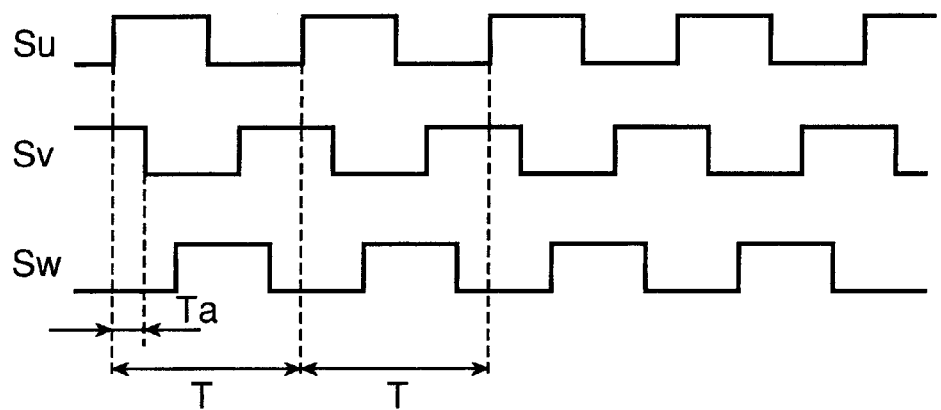
FIG. 5 is a timing chart of the output signals from the Hall ICs in a fan drive device according to a second preferred embodiment of the present invention when the fan drive motor is reverse-driven.

FIG. 5 is a timing chart showing the output signals Su, Sv, and Sw from the Hall ICs 11u, 11v, and 11w when the fan drive motor 10 is turning in reverse. As will be seen from FIG. 1, signal Su is output from Hall IC 11u, signal Sv is output from Hall IC 11v, and signal Sw is output from Hall IC 11w. To simplify the following description, it is again assumed below that the fan drive motor 10 is turning in reverse at a constant speed.

The control circuit 31 monitors the interval Ta between a change in the signal level of two selected adjacent Hall IC output signals Su, Sv, and Sw, and detects the period T of one of those signals. For example, the control circuit 31 monitors the interval Ta between a change in the signal level of signals Su and Sv, and monitors the period T of signal Su. If this interval Ta is less than a specific value T2, the control circuit 31 begins monitoring the other signals Sv and Sw.

The control circuit 31 thus monitors whether the speed of the fan drive motor 10 exceeds a specific threshold value based on interval Ta. If the interval Ta drops below this value T2, the control circuit 31 determines that the fan drive motor speed exceeds the threshold value, and then begins monitoring the other signals Sv and Sw during the next period T of signal Su. It can thereby detect whether the rotor of the fan drive motor 10 is actually spinning, or whether there is simply oscillation in the rotor magnet position caused by an external force such as the wind.

If the control circuit 31 then detects that the levels of both signals Sv and Sw change during this next period T as shown in FIG. 5, it determines that the fan drive motor 10 is turning at a speed exceeding the specified threshold level.

If the interval Ta is detected as dropping below value T2 in a case as shown in FIG. 3, the control circuit 31 begins to monitor signals Sv and Sw during the next period T of signal Su. In this case, however, the level of signal Sv changes during period T, but the level of signal Sw does not change. The control circuit 31 thus determines that the fan drive motor 10 is not turning. It will also be obvious that the control circuit 31 detects that the fan drive motor 10 is not turning if after it begins monitoring signals Sv and Sw the signal level of signals Sv and Sw does not change in the next period T.

Figure 6:
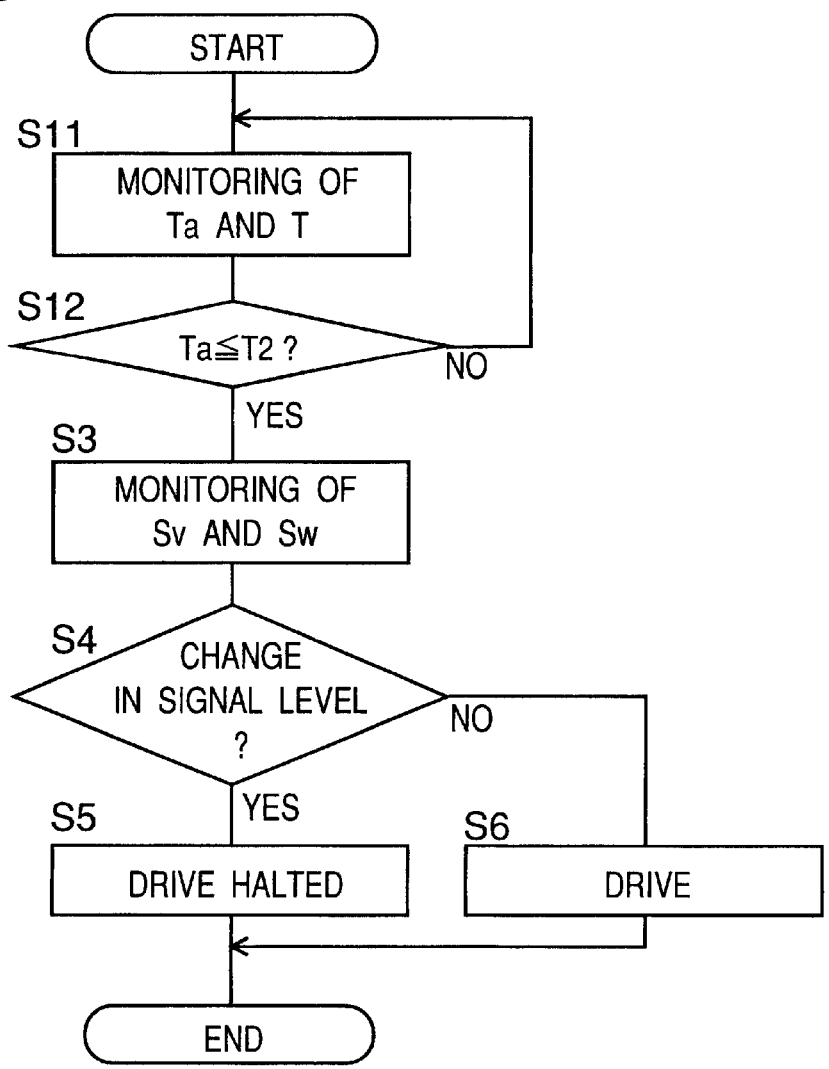
FIG. 6 is a flow chart of the fan drive motor speed detection operation of the control circuit.

FIG. 6 is a flow chart used below to describe the operation whereby control circuit 31 detects the speed of the fan drive motor 10. It is to be noted that like steps in FIG. 4 and FIG. 6 are identified by the same reference numerals, and further description thereof is omitted below other than to note that these same steps are performed by the control circuit 31 of this second embodiment. It is to be further noted that unless otherwise stated, the operations performed at each step shown in FIG. 6 are performed by the control circuit 31 of this second embodiment.

When this operation starts, the control circuit 31 monitors the interval Ta between a signal level change in two of the signals Su, Sv, and Sw obtained from adjacent Hall ICs 11u, 11v, and 11w, and monitors the period T of one of these two output signals. In this exemplary embodiment the control circuit 31 monitors the interval Ta between a signal level change in signals Su and Sv, and monitors the period T of signal Su (S11). Decision diamond S12 then detects whether interval Ta is less than or equal to value T2. If it is (yes), steps S3 to S6 in FIG. 4 are performed; if not, that is, if interval Ta is greater than value T2 and S12 returns no, the procedure loops back to step S11.

The fan drive device according to this second embodiment of the present invention thus monitors signals from two adjacent Hall ICs to detect the interval Ta at which there is a level change in the two signals, and then detects from this interval Ta whether the fan drive motor 10 is turning at a speed exceeding a predetermined threshold level. The fan drive device according to this second embodiment is therefore able to achieve the same benefits as a fan drive device according to the first embodiment described above.

Embodiment 3

As will be seen from the above description, The fan drive device according to the first embodiment of the present invention first monitors a signal from a desired one of plural Hall ICs to detect whether the fan drive motor 10 is turning at a speed exceeding a specific threshold level. The fan drive device according to this third embodiment of the invention, however, monitors the output signals Su, Sv, and Sw obtained from each of the Hall ICs 11u, 11v, and 11w, detects the intervals between level changes in adjacent output signals Su, Sv, and Sw, and detects whether the fan drive motor 10 is turning at a speed greater than or equal to a specific threshold level based on the number of consecutive periods in which the detected intervals are shorter than a specified level.

The fan drive device 40 according to this third embodiment differs from that of the first embodiment in operation, and is therefore described below with reference to FIG. 1. As shown in FIG. 1, this fan drive device 40 comprises a control circuit 41. The fan drive device 40 according to this third embodiment is described below with reference to the differences in the operation of the control circuit 41.

Figure 7:
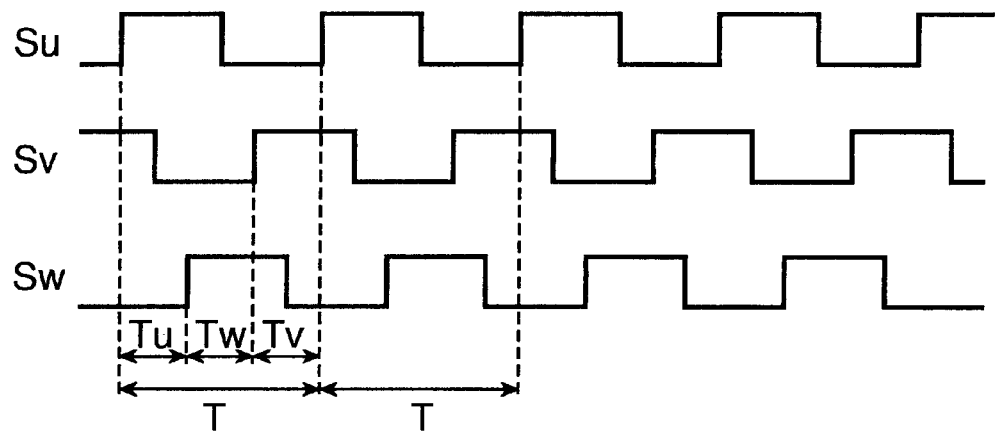
FIG. 7 is a timing chart of the output signals from the Hall ICs in a fan drive device according to a third preferred embodiment of the present invention when the fan drive motor is reverse-driven.

FIG. 7 is a timing chart showing the output signals Su, Sv, and Sw from the Hall ICs 11u, 11v, and 11w when the fan drive motor 10 is turning in reverse. As will be seen from FIG. 1, signal Su is output from Hall IC 11u, signal Sv is output from Hall IC 11v, and signal Sw is output from Hall IC 11w. To simplify the following description, it is again assumed below that the fan drive motor 10 is turning in reverse at a constant speed.

The control circuit 41 monitors each of the output signals Su, Sv, and Sw to detect the interval at which there is a signal level change in the signals from any two adjacent Hall ICs. More specifically, the control circuit 41 detects the timing at which the output signals Su, Sv, and Sw change from low to high to monitor intervals Tu, Tv, and Tw, where interval Tu is the time from when signal Su changes from low to high to when signal Sw changes from low to high, interval Tw is the time from the level change in signal Sw to the level change in signal Sv, and interval Tv is the time from the level change in signal Sv to the level change in signal Su.

The control circuit 41 then determines that the fan drive motor 10 is turning at a specified speed or greater if the intervals Tu to Tw are consecutively shorter than a predetermined level T3 within a period T, that is, if the frequency of signal Su continuously exceeds a specific frequency T4 ($\geq 1$), for example.

In the case shown in FIG. 3, only interval Tv is shorter than T3, and the control circuit 41 cannot detect intervals Tu and Tw. The control circuit 41 therefore determines that the fan drive motor 10 is not turning. It is to be noted that intervals Tu, Tv, and Tw can also be obtained by detecting the timing at which output signals Su, Sv, and Sw change from high to low.

It should also be noted that it is not always necessary to detect the timing at which the level of output signals Su, Sv, and Sw change to a same signal level. Referring to FIG. 7, for example, interval Tu can be the interval between when signal Su changes from low to high and when signal Sv changes from high to low; interval Tv can be the interval between when signal Sv change from low to high and when signal Sw changes from high to low; and interval Tw can be the interval between when signal Sw changes from low to high and when signal Su changes from high to low.

Figure 8:
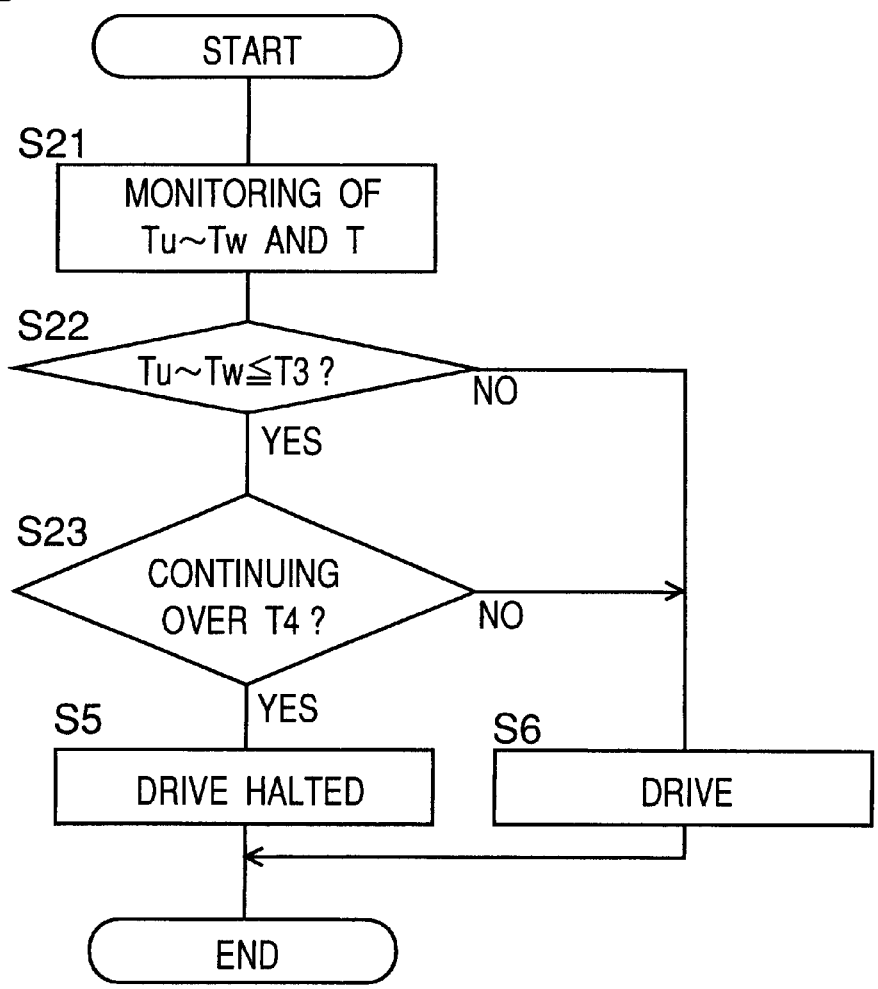
FIG. 8 is a flow chart of the fan drive motor speed detection operation of the control circuit.
Figure 9:
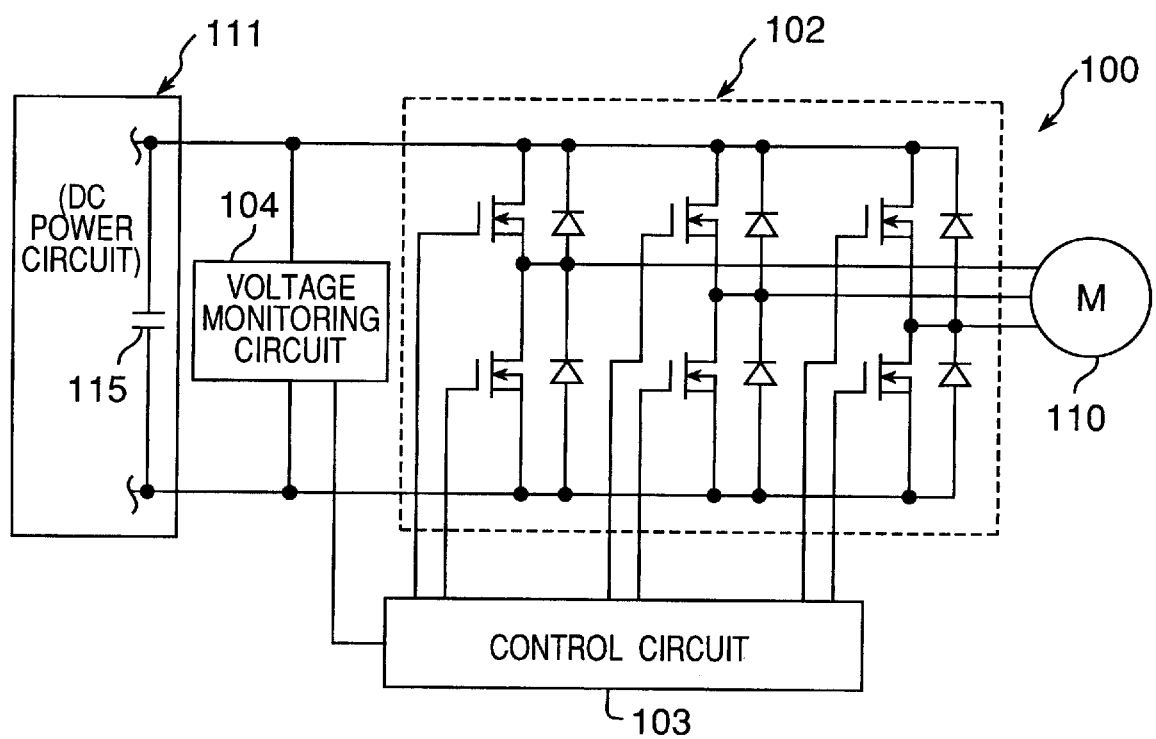
FIG. 9 is a typical circuit diagram of a fan drive device that is exemplary of the related art.

FIG. 8 is a flow chart used below to describe the operation whereby control circuit 41 detects the speed of fan drive motor 10. It is to be noted that like steps in FIG. 4 and FIG. 8 are identified by the same reference numerals, and further description thereof is omitted below other than to note that these same steps are performed by the control circuit 41 of this third embodiment. It is to be further noted that unless otherwise stated, the operations performed at each step shown in FIG. 8 are performed by the control circuit 41 of this third embodiment.

When this operation starts, the control circuit 41 monitors the interval between a signal level change in any two of the signals Su, Sv, and Sw obtained from adjacent Hall ICs 11u, 11v, and 11w, and monitors the period T of one of the output signals, for example, signal Su (S21). Decision diamond S22 then detects whether all intervals Tu, Tv, and Tw are less than or equal to value T3. If yes, steps S23 is performed; if no, that is, if an interval exceeds T3, step S6 is performed, the fan drive motor is driven, and this procedure ends.

If all intervals Tu, Tv, and Tw are less than or equal to value T3, decision diamond S23 determines whether the frequency of this condition exceeds a specific frequency T4. If yes, driving the fan drive motor is prohibited (S5), and the procedure ends. If not, that is, if frequency T4 is not exceeded, step S6 is performed, the fan drive motor is driven, and this procedure ends.

The fan drive device according to this third embodiment of the present invention thus monitors the output signals Su, Sv, and Sw from Hall ICs 11u, 11v, and 11w to detect the intervals Tu, Tv, and Tw at which the signal level of signals from any two adjacent Hall ICs change. The control circuit 41 then detects whether the fan drive motor 10 is turning at a predetermined speed or greater based on the frequency at which each of the detected intervals Tu to Tw remains continuously less than a specified value T3. The fan drive device according to this third embodiment is therefore able to achieve the same benefits as a fan drive device according to the first embodiment described above.

Although the present invention has been described in connection with the preferred embodiments thereof with reference to the accompanying drawings, it is to be noted that various changes and modifications will be apparent to those skilled in the art. For example, while the first to third embodiments of the present invention have been described as utilizing a three-phase motor having polar position sensors, the invention shall not be limited thereto and the present invention can detect rotor speed in any n-phase motor (where n is a natural number) having polar position sensors.

Accordingly, such changes and modifications are to be understood as included within the scope of the present invention as defined by the appended claims, unless they depart therefrom.

What is claimed is:

1. A fan drive device for drive control of a direct current, brushless fan drive motor having a plurality of sensors for converting to and outputting as a two-value signal a change in magnetic pole position resulting from rotation of a fan drive motor rotor magnet in the direct current, brushless fan drive motor, said fan drive device comprising:

a drive circuit section for driving the direct current, brushless fan drive motor; and a control circuit section for controlling said drive circuit section according to an output signal from each sensor in the fan drive motor, wherein said control circuit section prohibits said drive circuit section from driving the direct current, brushless fan drive motor when the direct current, brushless fan drive motor is not being driven by said drive circuit section and the direct current, brushless fan drive motor speed is detected to exceed a specific speed based on signals output from the plurality of sensors.

2. The fan drive device as set forth in claim 1, wherein said control circuit section determines the direct current, brushless fan drive motor speed to be greater than or equal to the specific speed when, after a rectangular wave signal having a period less than or equal to a specific period is detected from any one of the plurality of sensors, a level of a signal supplied from another or the plurality of sensors changes within a specific time.

3. The fan drive device as set forth in claim 2, wherein the specific time is a time of one period of the detected rectangular wave signal having a period less than or equal to a specific period.

4. The fan drive device as set forth in claim 1, wherein said control circuit section determines the direct current, brushless fan drive motor speed to be greater than or equal to the specific speed when a level of one of two rectangular wave signals input from any two adjacent sensors changes, a level of the other of the two rectangular wave signals then changes, an interval between a time when the level of the one of the two rectangular wave signals changes and a time when the level of the other of the two rectangular wave signals changes is less than a specific value, and a level of the signals input from all other sensors then changes within a specific time.

5. The fan drive device as set forth in claim 4, wherein the specific time is a time of one period of either of the two rectangular wave signals input from two adjacent sensors.

6. The fan drive device as set forth in claim 1, wherein said control circuit section monitors an output signal from each sensor, detects for each pair of adjacent sensors an interval between a signal level change in a rectangular wave signal input thereto from one of two adjacent sensors and a signal level change in an output signal of the other of the two adjacent sensors, and determines the direct current, brushless fan drive motor speed to be greater than or equal to the specific speed when all detected intervals are shorter than a specified period and this state continues for a specified time.

7. The fan drive device as set forth in claim 6, wherein the specified time is greater than or equal to a time of one period of a rectangular wave signal input from any one of the plurality of sensors.

* * * * *